US011416627B2

(12) United States Patent
Twede et al.

(10) Patent No.: US 11,416,627 B2
(45) Date of Patent: Aug. 16, 2022

(54) IMAGING DEVICE TRANSMITS BROADCAST ID TO USER DEVICE, AND THE IMAGING DEVICE RECEIVES TOKEN TO CONNECT TO CENTRAL SERVER AND SECURE AN AUTHORIZED ACCESS OF THE IMAGING DEVICE BY USER

(71) Applicant: Hewlett-Packard Development Company, L.P., Spring, TX (US)

(72) Inventors: Roger S Twede, Boise, ID (US); Deny Joao Correa Azzolin, Vancouver, WA (US); Joseph Yang, Cypress, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/298,558

(22) PCT Filed: Apr. 30, 2019

(86) PCT No.: PCT/US2019/029954

§ 371 (c)(1),
(2) Date: May 29, 2021

(87) PCT Pub. No.: WO2020/222811

PCT Pub. Date: Nov. 5, 2020

(65) Prior Publication Data

US 2022/0043922 A1 Feb. 10, 2022

(51) Int. Cl.

| | |
|---|---|
| ***G06F 3/12*** | (2006.01) |
| ***G06F 21/60*** | (2013.01) |
| ***H04L 9/40*** | (2022.01) |

(52) U.S. Cl.
CPC .......... *G06F 21/608* (2013.01); *G06F 3/1222* (2013.01); *G06F 3/1238* (2013.01);
(Continued)

(58) Field of Classification Search
None
See application file for complete search history.

(56) References Cited

U.S. PATENT DOCUMENTS 6,865,679 B1 * 3/2005 Dennison .............. G06F 21/608
726/21
7,263,661 B2 8/2007 Chavers et al.
(Continued)

FOREIGN PATENT DOCUMENTS

JP 2019049986 A 3/2019

*Primary Examiner* — Haris Sabah
(74) *Attorney, Agent, or Firm* — Jefferson IP Law, LLP

(57) ABSTRACT

An example imaging device includes a communication engine to transmit a broadcast message including a broadcast ID corresponding to the imaging device. The communication engine further is to receive a session token from a central server in response to a request for accessing the imaging device received from a user device in receipt of the broadcast ID. The session token is to connect the imaging device to a user session corresponding to a user of the user device. The imaging device further comprises a user authorization engine to obtain preliminary user details from the central server using the session token. The preliminary user details include a login ID and a user-selected authentication mode. The user authorization engine is to set-up a user login session using the preliminary user details for receiving user authentication approval from the central server to allow the user to access the imaging device.

15 Claims, 5 Drawing Sheets

(52) U.S. Cl.
CPC ........ *H04L 63/0892* (2013.01); *H04L 63/101* (2013.01); *G06F 3/1204* (2013.01)

(56) References Cited

U.S. PATENT DOCUMENTS

| | | | | |
|---|---|---|---|---|
| 8,045,961 | B2 | 10/2011 | Ayed et al. | |
| 9,007,623 | B2 | 4/2015 | St. Jacques, Jr. et al. | |
| 9,729,643 | B2 | 8/2017 | Lebeau et al. | |
| 9,794,443 | B2 | 10/2017 | Su et al. | |
| 9,804,811 | B2 | 10/2017 | Wong | |
| 9,986,110 | B2 | 5/2018 | Channa | |
| 2007/0101415 | A1 | 5/2007 | Masui | |
| 2008/0270911 | A1 | 10/2008 | Dantwala et al. | |
| 2013/0278966 | A1 | 10/2013 | Saito et al. | |
| 2014/0036309 | A1* | 2/2014 | Oguma | G06F 3/1259 358/1.15 |
| 2015/0286451 | A1* | 10/2015 | Armstrong | G06F 3/1205 358/1.15 |
| 2016/0313954 | A1* | 10/2016 | Arora | H04L 63/0876 |
| 2017/0195523 | A1* | 7/2017 | Lim | H04L 63/10 |
| 2018/0165040 | A1* | 6/2018 | Matsuda | H04N 1/00 |
| 2018/0262492 | A1* | 9/2018 | Daniel | H04N 1/00103 |
| 2019/0134910 | A1* | 5/2019 | Casey | G06F 3/1287 |

* cited by examiner

IMAGING DEVICE TRANSMITS BROADCAST ID TO USER DEVICE, AND THE IMAGING DEVICE RECEIVES TOKEN TO CONNECT TO CENTRAL SERVER AND SECURE AN AUTHORIZED ACCESS OF THE IMAGING DEVICE BY USER

BACKGROUND

Imaging devices are peripherals commonly used in home and office environments for obtaining copies of digital documents having print data, such as text or image. Imaging devices, such as multi-functional printers support multiple functions, such as printing, scanning of a document, photocopying of a document, and fax or email of a scanned document. Usually, the imaging devices may be accessed using a user device connected to the imaging device using wired connections for giving operational instructions and for receiving digital copies of documents. With advent in technology, remote client devices may also connect to imaging devices using wireless connections for giving operational instructions and for receiving digital copies of documents.

BRIEF DESCRIPTION OF DRAWINGS

The detailed description is described with reference to the accompanying figures. It should be noted that the description and figures are merely examples of the present subject matter and are not meant to represent the subject matter itself.

Figure 1:
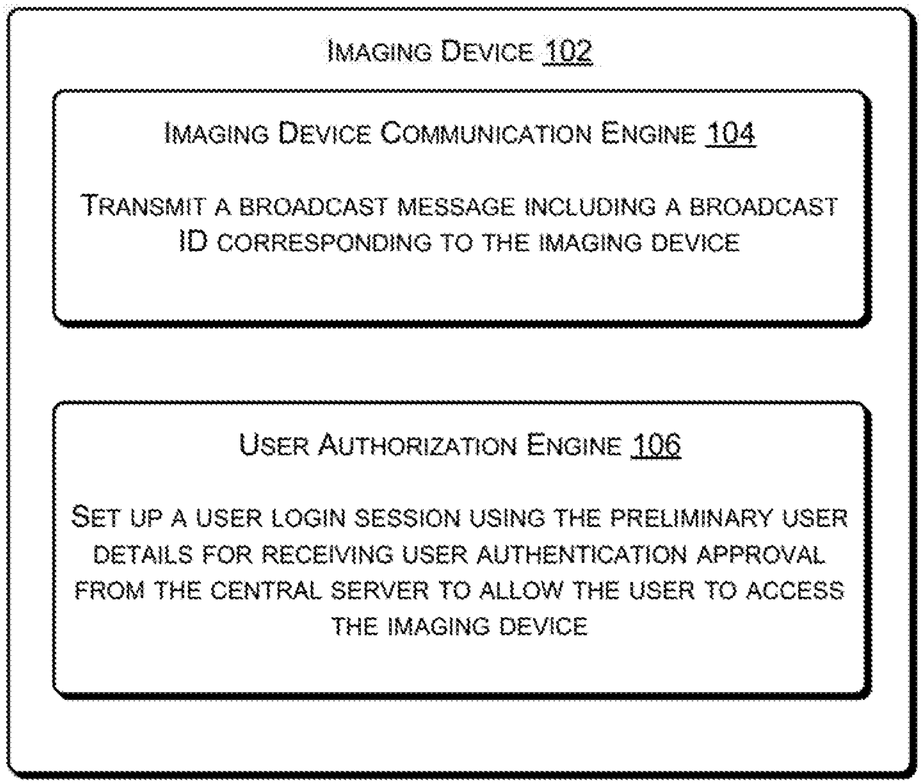
FIG. 1 illustrates an imaging device, according to an example implementation of the present subject matter.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations, provided in the drawings.

DETAILED DESCRIPTION

Imaging devices are peripherals commonly used in home and office environments for obtaining printed copies of digital documents having print data, such as text or image. Imaging devices, such as multi-functional printers support multiple functions, such as printing, scanning of a document, photocopying of a document, and fax or email of a scanned document. Usually, to obtain the printed copies from an imaging device, a user may have to register with and be connected to the imaging device prior to sending a document for printing. Therefore, each time a user visits a new facility, the user may have to locate an imaging device, register with the imaging device, and connect with the imaging device over a local area network to use the imaging device, making it cumbersome for the user. Further, in case the user is registered with multiple imaging devices in a facility, say, in an office environment, the user may have to manually select the imaging device in the vicinity before giving a print command for obtaining the printed copies.

Further, in such cases the user may not be able to use their customized settings, such as shortcuts for different functions and print settings for each function. In case the user connects the imaging device to a user account created over a cloud environment to use the customized settings, the user may become vulnerable to security breach as an operator of the imaging device may obtain the login details of the user, as saved in the imaging device. Further, to obtain the printed copies, the user may have to login to the imaging device using an authentication method, such as login ID and password, biometric access, and access card. The user may thus have to save the login details with each of the imaging devices, thereby, making the user vulnerable to security breach. Further, saving the login details with each of the imaging devices may make it cumbersome for the user.

The present subject matter discloses example implementations for securing authorized access of an imaging device. In one example implementation of the present subject matter, the imaging device is to allow a user to access the imaging device based on user authentication approval from a central server. The central server is further connected to a user device of the user for receiving an authorization message for authenticating the user and allowing the imaging device to access a user account of the user. The central server thus facilitates a secure authentication of the user without requiring the user to save login details in the imaging device.

In one example implementation of the present subject matter, to obtain printed copies of a document, the user may enter a computing environment having the imaging device. As the user comes in vicinity of the imaging device, the user device of the user may receive a broadcast message including the broadcast ID corresponding to the imaging device. The user device may analyze the broadcast message to ascertain the broadcast ID corresponding to the imaging device and share the broadcast ID along with a user device ID with the central server.

Upon receiving the broadcast ID and the user device ID, the central server may create a user session with the imaging device to allow the user of the user device to access the imaging device. The user session may be a one-time session created as secure communication channel between the central server and the imaging device, such that details shared over the user session may not be available after the user session is terminated. The central server may subsequently share a session token of the user session with the imaging device to allow the imaging device to join the user session and obtain preliminary user details corresponding to the user of the user device. In one example, the preliminary user details may include a login ID of the user and a user-selected authentication mode corresponding to the user. The imaging device may then set-up a user login session using the preliminary user details for receiving user authentication approval from the central server to allow the user to access the imaging device.

In one example, if the user had selected the authentication mode as a one-step user device authentication mode, the imaging device may communicate an authentication request to the central server for authenticating the user. In another example, if the user had selected the authentication mode as a user login authentication mode, the imaging device may render a user customized login screen based on the user-selected authentication mode. Upon receiving a login request from the user through the user customized login screen, the imaging device may communicate the authentication request to the central server for authenticating the user.

Upon receiving the authentication request from the imaging device, the central server may share an authorization request with the user device. The user device may subsequently render an authorization request indication on a display screen of the user device asking the user to verify whether the user requested access to the imaging device. The user device may subsequently instruct the central server to share an authentication token with the imaging device to secure an authorized access of the imaging device by the user. Upon receiving the authentication token from the central server, the imaging device may access a user account, such as a central workstation, associated with the user using the authentication token to render a workscreen to the user. The workscreen may be customized as per user specified settings and may render documents, folders, shortcuts, printing settings corresponding to the user.

The present subject matter thus facilitates in ensuring authorized access of the imaging device without having the user authentication details saved in the imaging device. Having the user authentication performed by the central server using the user device facilitates in ensuring that the authentication details are not obtained by unauthorized users. Further, since the central server interacts with the imaging device and the user device in isolation, independent of each other, the details of the user device and the user are not shared with the imaging device, thereby securing the connection between the imaging device and the user device. Further, having the central server create the user session based on registration details of the user and the imaging device, the user does not have to register with multiple imaging devices. The user may thus use any imaging device registered with the central server for obtaining printed documents.

The present subject matter is further described with reference to FIGS. 1 to 5. It should be noted that the description and figures merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates an imaging device 102, according to an example implementation of the present subject matter. Examples of the imaging device 102 include, but are not limited to, a multifunction printer, a home printer, an office printer, a 3D printer, a scanner, and a photocopy device. In one example, the imaging device 102 may support various functionalities, such as printing of an electronic document and scanning of a document.

In one implementation, the imaging device 102 includes an imaging device communication engine 104 to transmit a broadcast message including a broadcast ID corresponding to the imaging device 102. The imaging device communication engine 104 may further receive a session token from a central server (not shown in this figure). In one example, the session taken may be received in response to a request for accessing the imaging device 102, received from a user device (not shown in this figure) in receipt of the broadcast ID. The session token is to connect the imaging device 102 to a user session corresponding to a user of the user device. The imaging device may thus join the user session for getting user authentication to allow the user the access to the imaging device 102.

The imaging device 102 further includes a user authorization engine 106 to obtain preliminary user details corresponding to the user from the central server using the session token. In one example, the preliminary user details include a login ID of the user and a user-selected authentication mode. The user authorization engine 106 may further set-up a user login session using the preliminary user details for receiving user authentication approval from the central server to allow the user to access the imaging device 102.

Figure 2:
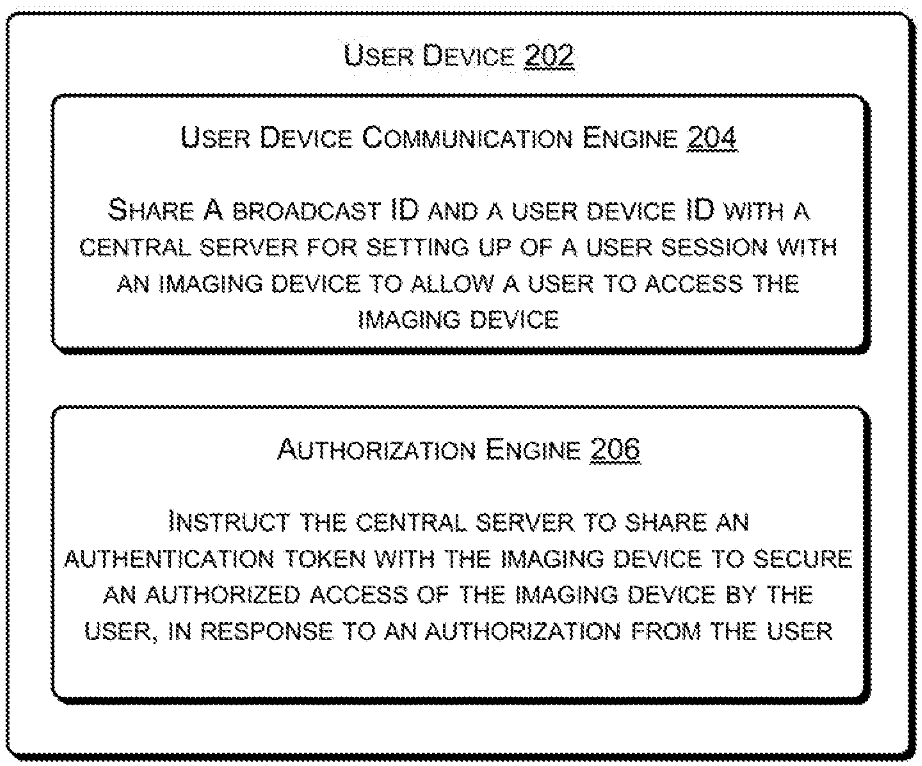
FIG. 2 illustrates a user device, according to an example implementation of the present subject matter.

FIG. 2 illustrates a user device 202, according to an example implementation of the present subject matter. Examples of the user device 202 include, but are not limited to, mobile devices, laptops, tablets, and portable computers.

In one example, the user device 202 includes a user device communication engine 204 to receive a broadcast message from an imaging device, say, the imaging device 102 in vicinity of the user device 202. The broadcast message may include the broadcast ID corresponding to the imaging device 102. The user device communication engine 204 may subsequently share the broadcast ID and a user device ID with a central server for setting up of a user session with the imaging device 102 to allow a user of the user device 202 to access the imaging device 102.

The user device 202 may further include an authorization engine 206 to render an authorization request indication on a display screen of the user device 202 in response to an authorization request received from the central server. The authorization engine 206 may subsequently instruct the central server to share an authentication token with the imaging device 102 to secure an authorized access of the imaging device 102 by the user, in response to an authorization from the user.

Figure 3:
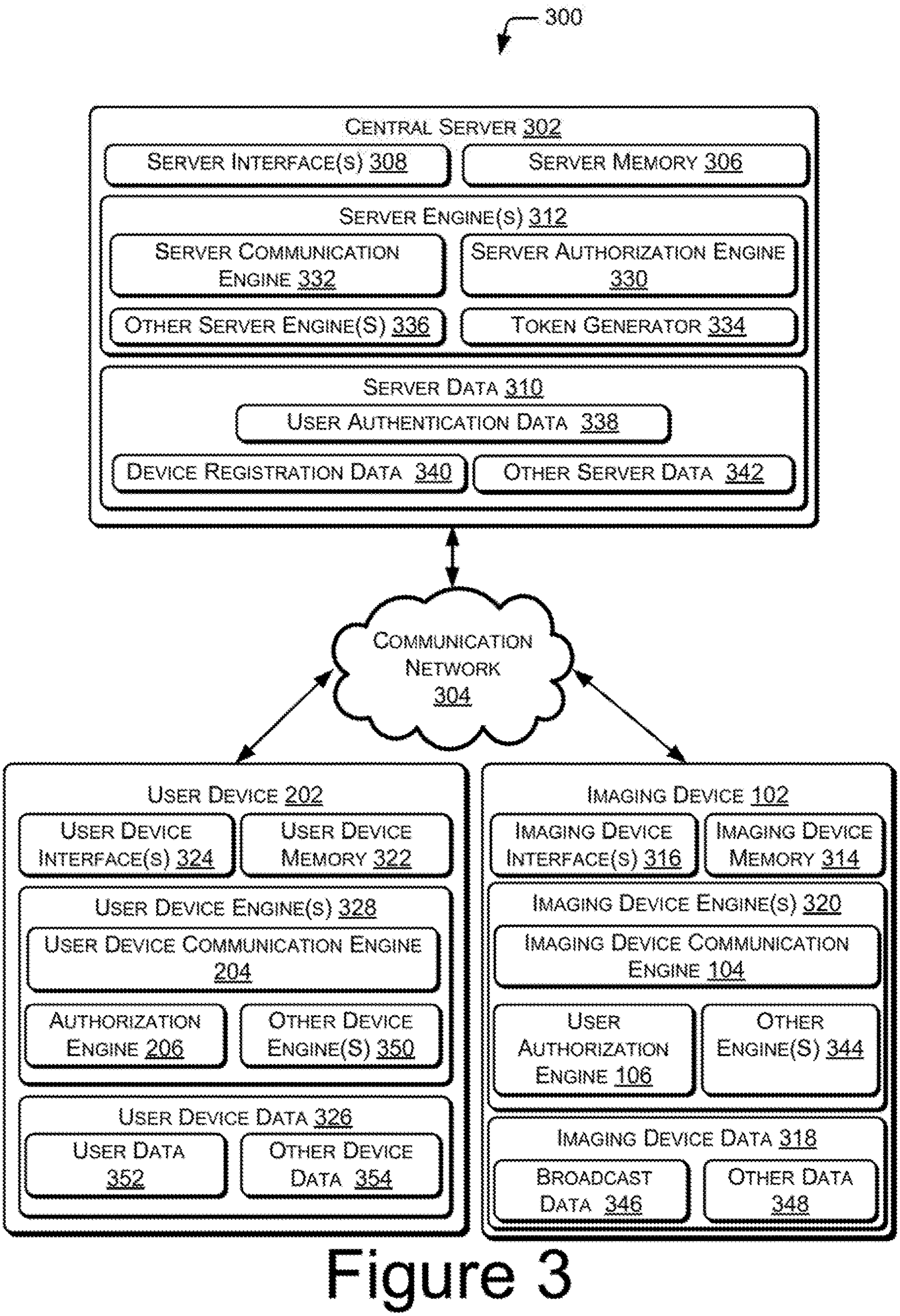
FIG. 3 illustrates a computing environment having the imaging device, the user device, and a central server according to an example implementation of the present subject matter.

FIG. 3 illustrates a computing environment 300 having the imaging device 102, the user device 202, and a central server 302, according to an example implementation of the present subject matter. Examples of the user device 202 include, but are not limited to, mobile devices, laptops, tablets, and portable computers. Examples of the imaging device 102 include, but are not limited to, a multifunction printer, a home printer, an office printer, a 3D printer, a scanner, and a photocopy device. The present approaches may also be implemented in other types of user device 202 and the imaging devices 102 without deviating from the scope of the present subject matter. The central server 302 may be network server that may be remotely or locally located. In one example, the central server 302 may be virtually located. In another example, the central server 302 may be implemented using distributed computing.

The imaging device 102, the user device 202, and the central server 302 may be connected with each other over a communication network 304. The communication network 304 may be a wireless network, a wired network, or a combination thereof. The communication network 304 can also be an individual network or a collection of many such individual networks, interconnected with each other and functioning as a single large network, e.g., the Internet or an intranet. The communication network 304 can be one of the different types of networks, such as intranet, local area network (LAN), wide area network (WAN), and the internet. In an example, the communication network 304 may include any communication network that use any of the commonly used protocols, for example, Hypertext Transfer Protocol (HTTP), and Transmission Control Protocol/Internet Protocol (TCP/IP).

In one example implementation, the imaging device 102, the user device 202, and the central server 302 include interface(s), memory, engine(s), and data. The interface(s) may include a variety of interfaces, for example, interfaces for data input and output devices, referred to as I/O devices, storage devices, network devices, and the like. The interface(s) facilitate communication between the imaging device 102, the user device 202, the central server 302, and various other computing devices connected in a networked environment. The interface(s) may also provide a communication pathway for one or more components of the imaging device 102, the user device 202, and the central server 302. Examples of such components include, but are not limited to, input device, such as keyboards, computer mice, and a touch enabled graphical, user interface.

The memory may store one or more computer-readable instructions, which may be fetched and executed to provide print interfaces to users for providing print instructions. The memory may include any non-transitory computer-readable medium including, for example, volatile memory such as RAM, or non-volatile memory such as EPROM, flash memory, and the like.

The engine(s) may be implemented as a combination of hardware and programming (for example, programmable instructions) to implement one or more functionalities of the engine(s). In examples described herein, such combinations of hardware and programming may be implemented in several different ways. For example, the programming for the engine(s) may be processor executable instructions stored on a non-transitory machine-readable storage medium and the hardware for the engine(s) may include a processing resource (for example, one or more processors), to execute such instructions. In the present examples, the machine-readable storage medium may store instructions that, when executed by the processing resource, implement engine(s). In such examples, the print device may include the machine-readable storage medium storing the instructions and the processing resource to execute the instructions, or the machine-readable storage medium may be separate but accessible to the print device and the processing resource. In other examples, engine(s) may be implemented by electronic circuitry. The data includes data that is either stored or generated as a result of functionalities implemented by any of the engine(s).

For example, the central server 302 may include server memory 306, server interface(s) 308, server data 310, and server engine(s) 312. The imaging device 102 may include imaging device memory 314, imaging device interface(s) 316, imaging device data 318, and imaging device engine(s) 320. The user device 202 may include user device memory 322, user device interface(s) 324, user device data 326, and user device engine(s) 328.

The server engine(s) 312 of the central server 302 include a server authorization engine 330, a server communication engine 332, a token generator 334, and other server engine(s) 336. The other server engine(s) 336 may implement functionalities that supplement applications or functions performed by the server engine(s) 312. Further, the server data 310 may include user authentication data 338, device registration data 340, and other server data 342.

The imaging device engine(s) 320 of the imaging device 102 include the imaging device communication engine 104, the user authorization engine 106, and other engine(s) 344. The other engine(s) 344 may implement functionalities that supplement applications or functions performed by the imaging device engine(s) 320. Further, the imaging device data 318 may include broadcast data 346, and other data 348.

The user device engine(s) 328 of the user device 202 include the user device communication engine 204, the authorization engine 206, and other device engine(s) 350. The other device engine(s) 350 may implement functionalities that supplement applications or functions performed by the user device engine(s) 328. Further, the user device data 326 may include user data 352, and other device data 354.

In one example, the imaging device 102 may be installed in the computing environment 300 and may be publicly accessible by multiple users. In one example, the computing environment 300 may have multiple imaging devices. In another example, the computing environment 300 may have a single imaging device. The imaging device 102 may be registered with the central server 302 to allow users to access the imaging device 102 without entering user credentials, such as login ID and password in the imaging device 102. In one example, the imaging device 102 may have an imaging device ID registered with the central server 302 to allow the central server 302 to recognize the image device 102. The imaging device 102 may use the imaging device 102 in communications with the central server 302. Further, the imaging device 102 may have a public ID, referred to as a broadcast ID, that may be used by the imaging device 102 in communications with other devices, such as the user device 202. The imaging device 102 may save the public ID and the broadcast ID in the broadcast data 346.

The user device 202 may be used by a user intending to access the imaging device 102 for obtaining print, scan, or copy of a document. In one example, the user and the user device 202 may be registered with the central server 302 for accessing other devices, such as the imaging device 102 without entering user credentials, such as login ID and password in the imaging device 102. The user may have a user ID registered with the central server 302 to allow the central server 302 to recognize the user. Further, the user device may have a user device ID registered with the central server 302 to allow the central server 302 to recognize the user device 202. The user device ID and the user ID may be mapped in a user device mapping table to allow the central server 302 to recognize a user account corresponding to the user device 202. In one example, the user may have multiple user devices registered with the central server 302, with each user device having an individual user device ID mapped to the user ID. The user device 202 may save the user device ID in the user data 352.

In one example, the user may be registered with a central workstation to save copies of their documents. The central workstation may be remotely accessed by the user device 202 over the communication network 304. In one example, the central workstation may be customized based on user settings and preferences and may include documents, folders, shortcuts, printing settings corresponding to the user. In one example, the central server 302 may manage the central workstation for the user and may have user authentication details, such as login ID and password to allow the user, the imaging device 102, and the user device 202 to access the central workstation. In one example, the central server 302 may host a cloud service having central workstations corresponding to the users registered with the central server 302. In another example, the cloud service having the central workstations may be hosted by an independent entity and managed by the central server 302 corresponding to the users registered with the central server 302. In one example, the central server 302 may store the user authentication details in the user authentication data 338.

In operation, to obtain a copy of a document, the user may enter a facility having the imaging device 102. As the user comes in vicinity of the imaging device 102, the user device 202 may receive a broadcast message including the broadcast ID corresponding to the imaging device 102. In one example, the imaging device 102 may transmit the broadcast message using short-range communication, such as near field, Bluetooth, and infrared. In one example, the imaging device 102 may periodically transmit the broadcast message. In another example, the imaging device 102 may regularly transmit the broadcast message.

In one example, the user device communication engine 204 of the user device 202 may receive the broadcast message. The authorization engine 206 of the user device 202 may further analyze the broadcast message to ascertain the broadcast ID corresponding to the imaging device 102. Subsequently, the user device communication engine 204 may share the broadcast ID along with the user device ID of the user device with the central server 302.

The server communication engine 332 of the central server 302 may receive the broadcast ID and the user device ID from the user device 202. Upon receiving the broadcast ID and the user device ID, the central server 302 may identify the imaging device 102 and the user device 202. In one example, the server communication engine 332 may use the user device mapping table to identify the user and the user device 202 corresponding to the user device ID. Further, the server communication engine 332 may use the imaging device mapping table to identify the imaging device ID and the imaging device 102 corresponding to the broadcast ID. In one example, the imaging device 102 may have the broadcast ID registered with the central server 302, to allow the central server 302 to recognize the imaging device 102 in any communication received from devices other than the imaging device 102. In one example, the server communication engine 332 may obtain the imaging device mapping table and the user device mapping table from the device registration data 340.

Subsequently, the central server 302 may set-up a user session with the imaging device 102 to allow the imaging device 102 to obtain preliminary user details corresponding to the user of the user device 202. In one example, the server authorization engine 330 may set-up the user session. The user session may be a one-time session created as a secure communication channel between the central server 302 and the imaging device 102. In one example, details shared over the user session may not be available after the user session is terminated. Further, the user session may be accessed by the imaging device 102 using a session token. In one example, the token generator 334 may generate the session token corresponding to the user session.

The session token may be a temporary token valid for short time period and may provide a restricted access of the central workstation of the user. For instance, the session token may provide the imaging device 102 an access to preliminary user details of the user but may not allow the imaging device 102 to access documents and settings corresponding to the user. In one example, the preliminary user details may include a login ID of the user and a user-selected authentication mode corresponding to the user. Examples of the user-selected authentication mode include, but are not limited to, a one-step user device authentication mode and a user login authentication mode. The one-step user device authentication mode and the user login authentication mode will be explained in detail while describing user authentication in later paragraphs.

The server communication engine 332 of the central server 302 may subsequently share the session token with the imaging device 102 to allow the imaging device to join the user session. The imaging device communication engine 104 of the imaging device 102 may receive the session token and determine that a user is attempting to access the imaging device 102. However, as the session token may not include user details, such as the user ID or the user device ID, the imaging device communication engine 104 may not be able to identify the user or the user device attempting to the access the imaging device. The user authorization engine 106 may subsequently use the session token to access the preliminary user details corresponding to the user of the user device 202.

The imaging device 102 may then set-up a user login session using the preliminary user details for receiving user authentication approval from the central server to allow the user to access the imaging device. In one example, the user authorization engine 106 may set-up the user login session based on the user-selected authentication mode. If the user-selected authentication mode is the one-step user device authentication mode, the user authorization engine 106 may communicate an authentication request to the central server 302. The user authorization engine 106 may, communicate the authentication request using the user login session for authenticating the user attempting to access the imaging device 102.

If the user-selected authentication mode chosen by the user is the user login authentication mode, the user authorization engine 106 may render a user customized login screen on an imaging device display screen (not shown in the figure). For instance, the user authorization engine 106 may render a user customized login screen having name and image of the user on the imaging device display screen. The user may be prompted to click on either the image or the name to indicate a login request expressing interest in using the imaging device 102. In one example, the user customized login screen may include multiple combinations of names and images corresponding to different users. The user in such a case may be prompted to click on either the image or the name from the combination corresponding to the user indicate the login request.

Upon receiving the login request from the user through the user customized login screen, the user authorization engine 106 may communicate the authentication request to the central server 302 for authenticating the user. As previously described, the user authorization engine 106 may communicate the authentication request using the user login session. The server communication engine 332 may receive the authentication request.

Upon receiving the authentication request from the imaging device 102, the server authorization engine 330 may analyze the authentication request to ascertain the request from the imaging device. On ascertaining the request to be a request for authorizing the user and for accessing the central workstation corresponding to the user, the server authorization engine 330 may determine if an authorization may be obtained from the user device.

The server communication engine 332 may accordingly share an authorization request with the user device 202 for authenticating the user attempting to access the imaging device 102. The authorization engine 206 of the user device 202 may subsequently render an authorization request indication to the user, requesting the user to verify whether the user requested for access to the imaging device 102. In one example, the authorization engine 206 may render the authorization request indication on a display screen (not shown in the figure) of the user device 202, asking the user to provide a verification using a verification indication method. Examples of the verification indication methods include, but are not limited to, providing a password, providing a pin code, swiping on the display screen, touching an icon on the display screen, and shaking the user device 202. In case the user wishes to approve the authentication request, the user may provide an authorization using the verification indication method.

Upon receiving the authorization from the user in response to the authorization request indication, the authorization engine 206 may instruct the central server 302 to share an authentication token with the imaging device to secure an authorized access of the imaging device 102 by the user. In one example, the authorization engine 206 may share an authorization message instructing the central server 302 to share the authentication token with the imaging device 102.

Upon receiving the authorization message, the token generator 334 may ascertain a confirmation of user access request and may generate the authentication token, indicating user authentication for imaging device access. In one example, the authentication token may be a temporary token valid for short time period and may provide a complete access of the central workstation of the user to the imaging device 102 for a predetermined time. The server communication engine 332 may share the authentication token with the imaging device 102, indicating the user authentication for imaging device access.

In one example implementation, the token generator 334 may generate and share the authentication token in response to receiving the authentication request from the imaging device 102. The central server 302 in said implementation, may not request the user device 202 for authorization and may provide the authentication token to the imaging device 102.

The imaging device communication engine 104 may receive the authentication token from the central server 302, indicating an approval to access the central workstation of the user, upon user authentication. The user authorization engine 106 may subsequently access the central workstation using the authentication token to render a workscreen to the user. In one example, the workscreen may be customized as per user specified settings and may render, for example, documents, folders, shortcuts, and printing settings corresponding to the user. Once the workscreen is rendered, the user may access documents from the central workstation for further processing. For example, the user may select documents and give print commands for obtaining printed documents.

In one example, the user authorization engine 106 may perform a secondary level of authorization before providing access to the workscreen. Upon receiving the authentication token, the user authorization engine 106 may render a secondary authentication request indication for the user. For example, the user authorization engine 106 may request the user to enter secondary authentication details, such as a secondary user ID and password. In one example, the user authorization engine 106 may obtain the secondary authentication details from the central workstation. Further, the secondary password may be a temporary code, such as a one-time password shared over the user device 202. The user authorization engine 106 may subsequently authenticate the user based on the secondary authentication details received from the user.

Figure 4:
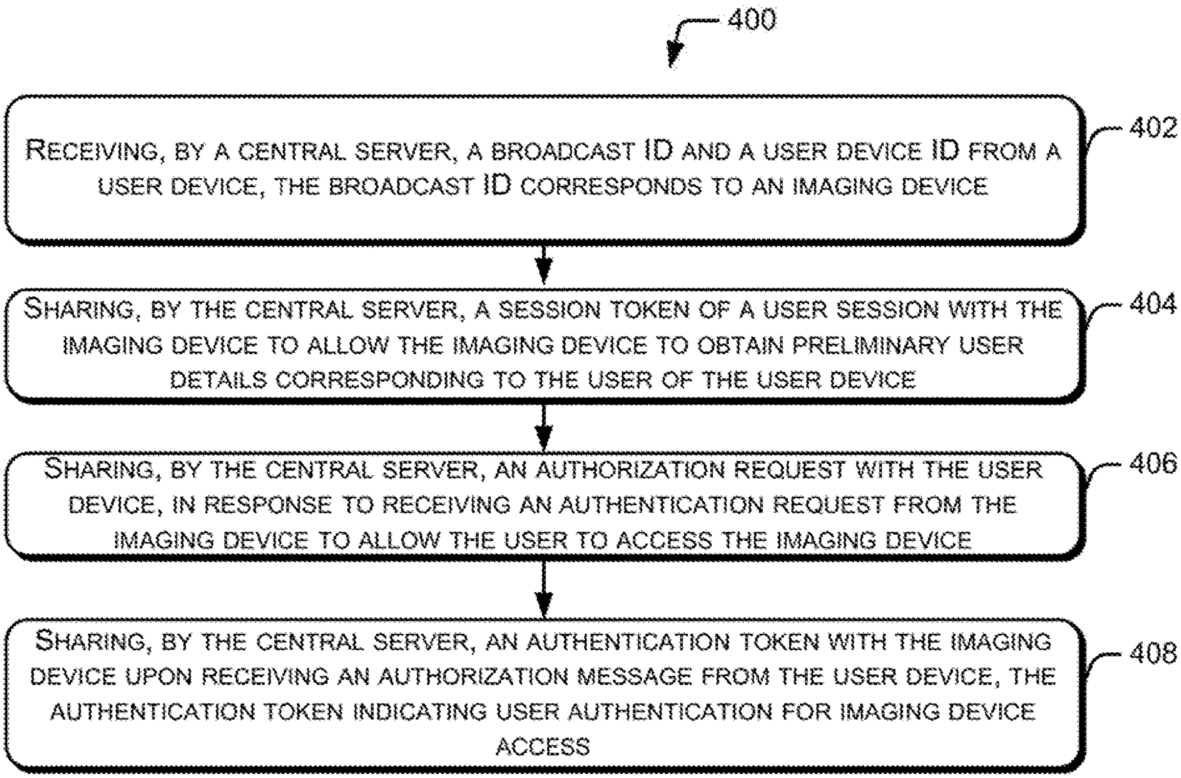
FIG. 4 illustrates a method for securing authorized access of an imaging device, according to an example implementation of the present subject matter.
Figure 5:
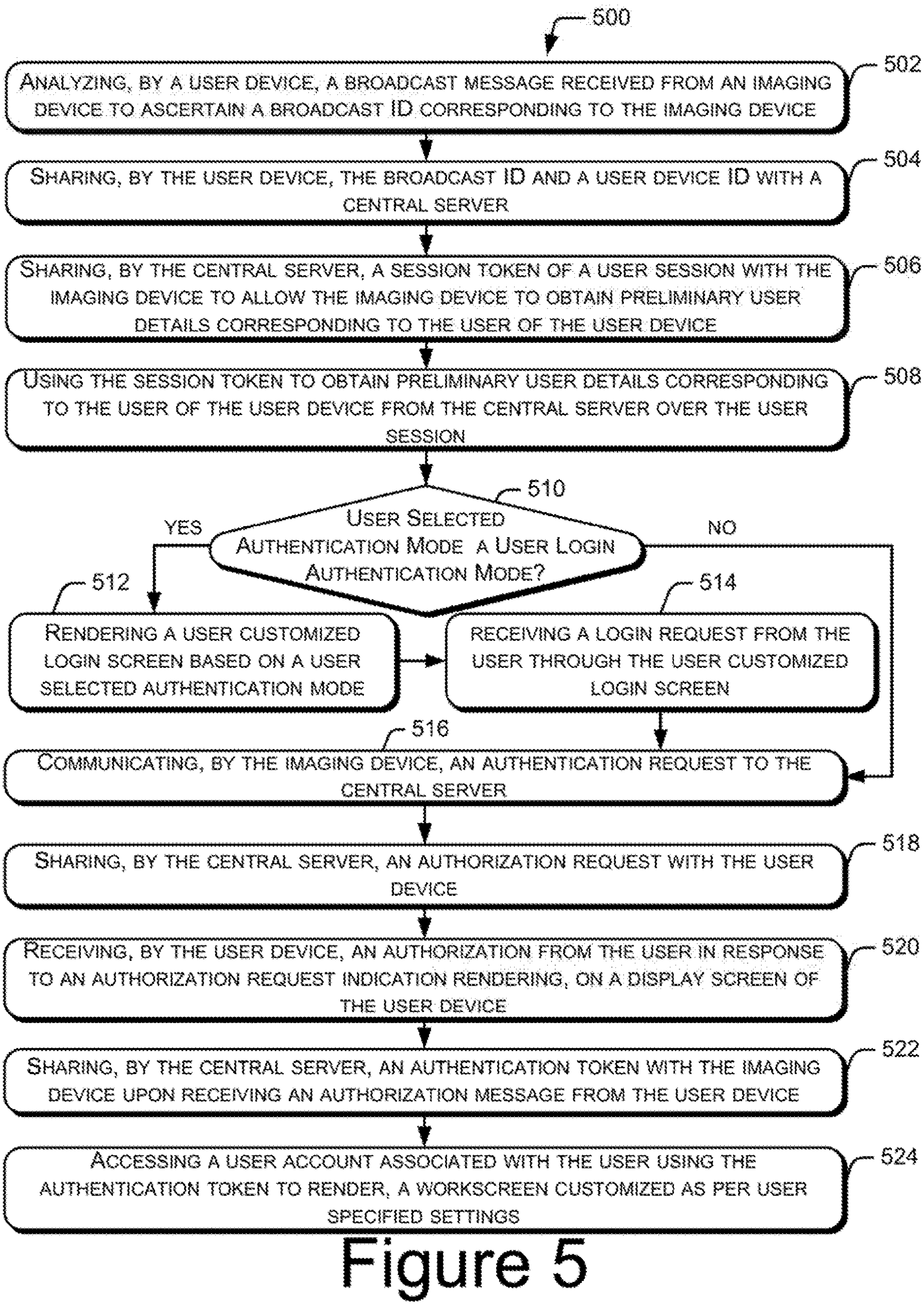
FIG. 5 illustrates a method for securing authorized access of an imaging device, according to another example implementation of the present subject matter.

FIGS. 4-5 illustrate example methods 400 and 500, respectively, for securing authorized access of an imaging device. The order in which the methods are described is not intended to be construed as a limitation, and any number of the described method blocks may be combined in any order to implement the methods, or an alternative method. Furthermore, methods 400 and 500 may be implemented by processing resource or computing device(s) through any suitable hardware, non-transitory machine readable instructions, or combination thereof.

It may also be understood that methods 400 and 500 may be performed by programmed computing devices, such as the central server 302, the user device 202 and the imaging device 102, as depicted in FIGS. 1-3. Furthermore, the methods 400 and 500 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. The methods 400 and 500 are described below with reference to the central server 302, the user device 202 and the imaging device 102 as described above; other suitable systems for the execution of these methods may also be utilized. Additionally, implementation of these methods is not limited to such examples.

FIG. 4 illustrates the method 400 for securing authorized access of an imaging device, according to an example implementation of the present subject matter. At block 402, a broadcast ID and a user device ID are received by a central server. In one example, the broadcast ID corresponds to an imaging device and the user device ID corresponds to a user device. The central server receives the broadcast ID and the user device ID from the user device. In one example, the user device, for instance, the user device 202 sends the broadcast ID and the user device ID to the central server when the user device is in vicinity of the imaging device, for instance, the imaging device 102.

At block 404, a session token of a user session is shared by the central server with the imaging device. In one example, the central server shares the session token to allow the imaging device to obtain preliminary user details corresponding to the user of the user device.

At block 406, an authorization request is shared by the central server with the user device. In one example, the central server may share the authorization request in response to receiving an authentication request from the imaging device to allow the user to access the imaging device.

At block 408, an authentication token is shared by the central server with the imaging device upon receiving an authorization message from the user device. In one example, the authentication token indicates user authentication for imaging device access.

FIG. 5 illustrates the method 500 for securing authorized access of an imaging device, according to another example implementation of the present subject matter. At block 502, a broadcast message received from an imaging device is analyzed by a user device. In one example, the broadcast message is received by the user device upon coming in vicinity of the imaging device. Further, the broadcast message is analyzed by the user device to ascertain a broadcast ID corresponding to the imaging device.

At block 504, the broadcast ID and a user device ID are shared by the user device with a central server. In one example, the user device ID corresponds to the user device.

At block 506, a session token of a user session is shared by the central server with the imaging device. In one example, upon receiving the broadcast ID and the user device ID, the central server may identify the imaging device corresponding to the broadcast ID using an imaging device mapping table. Further, the central server may identify the user device corresponding to the user device ID using a user device mapping table. The central server may subsequently share the session token to allow the imaging device to obtain preliminary user details corresponding to the user of the user device.

At block 508, preliminary user details corresponding to the user of the user device are obtained by the imaging device using the session token. In one example, the preliminary user details are obtained from the central server over the user session. The preliminary user details may include a login ID of the user and a user-selected authentication mode.

At block 510, it is determined whether the user-selected authentication mode is a user login authentication mode. If, in case it is determined that the user-selected authentication mode is the user login authentication mode, ('Yes' path from block 510), a user customized login screen is rendered based on the user-selected authentication mode at block 512. In one example, the user customized login screen may indicate name and image of the user. In another example, the user customized login screen may include multiple combinations of names and images corresponding to different users.

At block 514, a login request from the user is received through the user customized login screen. In on example, the user may be prompted to click on either the image or the name rendered on the user customized login screen to indicate the login request. The method may further proceed to block 516.

In case, it is determined that the user-selected authentication mode is a one-step user device authentication mode and not the user login authentication mode, ('No' path from block 510), an authentication request is communicated to the central server at block 516.

At block 518, an authorization request is shared by the central server with the user device. In one example, the central server may share the authorization request in response to receiving an authentication request from the imaging device to allow the user to access the imaging device.

At block 520, the authorization request from the central server is received by the user device for authenticating the user attempting to access the imaging device. In one example, upon receiving the authorization request, the user device may render an authorization request indication on a display screen of the user device in response to the authorization request received from the central server. Upon receiving the authorization from the user in response to the authorization request indication, the user device may share an authorization message with the central server. In one example, the authorization message is to instruct the central server to share the authentication token with the imaging device to secure an authorized access of the imaging device by the user.

At block 522, an authentication token is shared by the central server with the imaging device upon receiving an authorization message from the user device. In one example, the authentication token indicates user authentication for imaging device access.

At block 524, a user account associated with the user is accessed by the imaging device using the authentication token. In one example, the imaging device may render to the user, a workscreen customized as per user specified settings. In one example, the workscreen may render documents, folders, shortcuts, printing settings corresponding to the user.

Although examples for the present subject matter have been described in language, specific to structural features and/or methods, it should be understood that the appended claims are not limited to the specific features or methods described. Rather, the specific features and methods are disclosed and explained as examples of the present subject matter.

What is claimed is:

1. An imaging device comprising:

an imaging device communication engine to:

transmit a broadcast message including a broadcast ID corresponding to the imaging device; and receive a session token from a central server in response to a request for accessing the imaging device received by the central server from a user device in receipt of the broadcast ID, the session token to connect the imaging device to the central server to join a user session corresponding to a user of the user device; and a user authorization engine to:

obtain preliminary user details corresponding to the user from the central server using the session token, wherein the preliminary user details include a login ID of the user and a user-selected authentication mode; and set-up a user login session using the preliminary user details for receiving user authentication approval from the central server to allow the user to access the imaging device.

2. The imaging device as claimed in claim 1, wherein the user authorization engine further is to:

for the user-selected authentication mode being a one-step user device authentication mode, communicate an authentication request to the central server using the user login session for authenticating the user attempting to access the imaging device;

receive an authentication token from the central server indicating the user authentication approval; and access a user account associated with the user using the authentication token to render to the user, a workscreen customized as per user specified settings, wherein the workscreen is to render documents, folders, shortcuts, printing settings corresponding to the user.

3. The imaging device as claimed in claim 1, wherein the user authorization engine further is to:

render a user customized login screen based on the user-selected authentication mode, for the user-selected authentication mode being a user login authentication mode;

receive a login request from the user through the user customized login screen;

communicate an authentication request to the central server using the user login session for authenticating the user attempting to access the imaging device;

receive an authentication token from the central server indicating user authentication; and access a user account associated with the user using the authentication token to render to the user, a workscreen customized as per user specified settings, wherein the workscreen is to render documents, folders, shortcuts, printing settings corresponding to the user.

4. The imaging device as claimed in claim 3, wherein the user authorization engine further is to:

render a secondary authentication request indication upon receiving the authentication token; and receive secondary authentication details from the user of the user device.

5. A method for securing authorized access of an imaging device, the method comprising:

receiving, at a central server, a broadcast ID and a user device ID from a user device, wherein the broadcast ID corresponds to an imaging device, and wherein the user device ID corresponds to the user device;

transmitting, by the central server to the imaging device, a session token of a user session to allow the imaging device to connect to the central server and obtain preliminary user details of a user of the user device;

transmitting, by the central server to the user device, an authorization request in response to receiving an authentication request from the imaging device to allow the user to access the imaging device; and transmitting, by the central server to the imaging device, an authentication token upon receiving an authorization message from the user device in response to the authorization request, the authentication token indicating user authentication for imaging device access.

6. The method as claimed in claim 5, further comprising:

identifying the imaging device corresponding to the broadcast ID using an imaging device mapping table; and identifying the user device corresponding to the user device ID using a user device mapping table.

7. The method as claimed in claim 5, further comprising:

transmitting, by the imaging device, a broadcast message including the broadcast ID corresponding to the imaging device;

receiving, by the user device, the broadcast message;

analyzing, by the user device, the broadcast message to ascertain the broadcast ID corresponding to the imaging device; and sharing, by the user device, the broadcast ID and the user device ID with the central server.

8. The method as claimed in claim 5, further comprising:

using the session token to obtain preliminary user details corresponding to the user of the user device from the central server over the user session, wherein the preliminary user details include a login ID of the user and a user-selected authentication mode;

for the user-selected authentication mode being a one-step user device authentication mode, communicating the authentication request to the central server using a user login session for authenticating the user attempting to access the imaging device;

receiving the authentication token from the central server; and accessing a user account associated with the user using the authentication token to render to the user, a workscreen customized as per user specified settings, wherein the workscreen is to render documents, folders, shortcuts, printing settings corresponding to the user.

9. The method as claimed in claim 5, further comprising:

using the session token to obtain the preliminary user details corresponding to the user of the user device from the central server over the user session, wherein the preliminary user details include a login ID of the user and a user-selected authentication mode;

for the user-selected authentication mode being a user login authentication mode, rendering a user customized login screen based on the user-selected authentication mode;

receiving a login request from the user through the user customized login screen;

communicating the authentication request to the central server using a user login session for authenticating the user attempting to access the imaging device;

receiving the authentication token from the central server; and accessing a user account associated with the user using the authentication token to render to the user, a workscreen customized as per user specified settings, wherein the workscreen is to render documents, folders, shortcuts, printing settings corresponding to the user.

10. The method as claimed in claim 9, further comprising:

rendering a secondary authentication request indication upon receiving the authentication token;

receiving secondary authentication details from the user of the user device; and authenticating the user based on the secondary authentication details.

11. The method as claimed in claim 5, further comprising:

receiving, by the user device, the authorization request from the central server for authenticating the user attempting to access the imaging device;

rendering, by the user device, an authorization request indication on a display screen of the user device in response to the authorization request received from the central server;

receiving, by the user device, the authorization from the user in response to the authorization request indication; and sharing, by the user device, the authorization message instructing the central server to share the authentication token with the imaging device to secure an authorized access of the imaging device by the user.

12. A user device comprising:

a user device communication engine to:

receive a broadcast message from an imaging device in vicinity of the user device, the broadcast message including a broadcast ID corresponding to the imaging device; and transmit the broadcast ID and a user device ID to a central server for setting up a connection between the imaging device and the central server to allow a user to access the imaging device; and an authorization engine to:

render an authorization request indication on a display screen of the user device in response to an authorization request received from the central server; and instruct the central server to share an authentication token with the imaging device to secure an authorized access of the imaging device by the user, in response to an authorization received from the user in response to the authorization request indication.

13. The user device as claimed in claim 12, wherein the authorization engine further is to receive the authorization request from the central server for authenticating the user attempting to access the imaging device.

14. The user device as claimed in claim 12, wherein the authorization engine further is to receive the authorization from the user in response to the authorization request indication.

15. The user device as claimed in claim 12, wherein the authorization engine further is to analyze the broadcast message to ascertain the broadcast ID corresponding to the imaging device.

* * * * *